Dec. 11, 1951 A. D. BAYLOR 2,578,335

MULTIBAND OSCILLATOR

Filed Dec. 27, 1948

INVENTOR.
Arthur Donald Baylor
BY Alden D. Redfield
Charles M. Hogan
ATTORNEYS

Patented Dec. 11, 1951 2,578,335

UNITED STATES PATENT OFFICE 2,578,335

MULTIBAND OSCILLATOR

Arthur Donald Baylor, Cincinnati, Ohio, assignor to Avco Manufacturing Corporation, Cincinnati, Ohio, a corporation of Delaware Application December 27, 1948, Serial No. 67,273

5 Claims. (Cl. 250—36)

Figure 1:
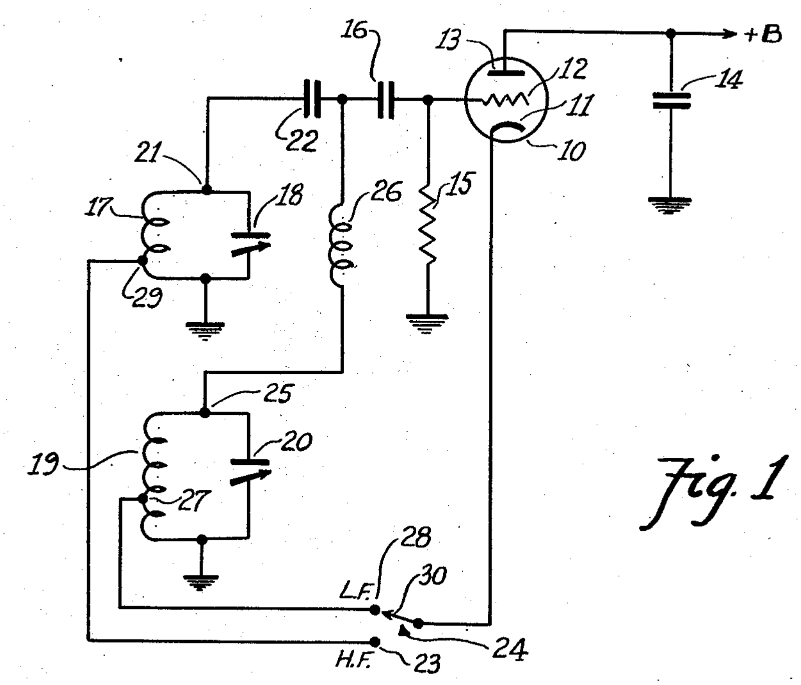

The present invention relates to radio-frequency oscillators and particularly to oscillators provided with switching means and a pair of tank circuits rendering them suitable for utility on two distinct bands.

The usual prior art oscillator, operable over two bands, such as the AM broadcast band and FM broadcast band, comprises at least one vacuum tube, a pair of tank circuits, and at least two electrical contacts at the terminals of each of the tank circuits, the four terminals being included in a range switch which is operable to select one tank circuit or the other in accordance with the band desired. Each pair of contacts is so arranged as selectively to be connected to two of the tube electrodes, such as the grid and cathode, for example.

The number of switch contacts in the radio-frequency circuits of an oscillator should be minimized, to improve oscillator stability and production uniformity. Further, it would be desirable, from the standpoint of cost reduction, to minimize the number of such contacts.

It is therefore an object of the present invention to provide an improvement over prior art circuits, which has such construction and operation that two of the aforementioned contacts are eliminated, so that only one electrode, rather than two, is selectively mechanically connected to the tank circuits involved.

The broad objects of the invention are to achieve the desirable characteristics mentioned above.

For a better understanding of the present invention, together with other and further objects, advantages, and capabilities thereof, reference is made to the following detailed description of the accompanying drawings, in which there are illustrated two two-band oscillators in accordance with the invention.

Figure 2:
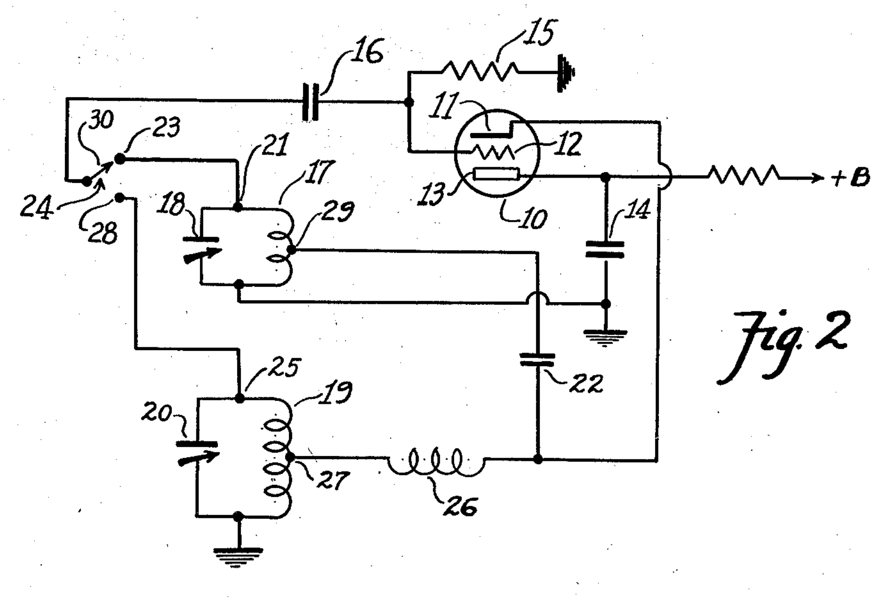

In the drawings:

Fig. 1 is a circuit schematic of a two-band oscillator, in which only the cathode is selectively mechanically connected to the separate tank circuits as the distinct bands are selected; and Fig. 2 is a circuit schematic of a modified form of two-band oscillator, in accordance with the invention, in which only the grid electrode is selectively mechanically connected to the separate tank circuits for the purpose set forth.

In accordance with the invention I provide, in a multi-band oscillator, the combination of a high frequency tank circuit and a low frequency tank circuit, each of said tank circuits having two terminals, a vacuum tube having at least two electrodes adapted selectively to be coupled to either of said tank circuits, a capacitor having a very low impedance at the high frequency band and a very high impedance at the low frequency band for coupling one terminal of the high frequency tank circuit to one of said electrodes, an inductor having a very low impedance at the low frequency band and a very high impedance at the high frequency band for connecting one terminal of said low frequency tank circuit to the same electrode, and a range switch having two contacts individually connected to the remaining terminals of said tank circuits for coupling either of said terminals to said other electrode.

Referring now specifically to Fig. 1, there is shown a vacuum tube 10 having a cathode 11, a control electrode 12, and an anode 13, the latter adapted to be coupled to a source of space current (not shown) designated as +B, the usual plate by-pass condenser 14 being provided in conventional manner. The usual grid resistor 15 is connected between grid and ground, and a conventional coupling capacitor 16 is connected in series relationship with the control electrode. It will be seen that this oscillator is in the well-known broad Hartley category, and it includes a pair of tank circuits. The high frequency tank circuit comprises a parallel combination of an inductor 17 and a variable tuning capacitor 18. The low frequency tank circuit comprises the usual combination of an inductor 19 and a variable tuning capacitor 20.

Terminal 21 of the high frequency tank circuit is coupled to the control electrode by a capacitor 22, which functions as a very low impedance or effective short circuit over the high frequency band, which may, for example, be the FM band. Terminal 29 of the high frequency tank circuit is connected to a switch contact 23 included in a range switch 24.

Terminal 25 of the low frequency tank circuit is coupled to the control electrode through an inductor 26, which functions as a short circuit or low impedance over the low frequency band, say the AM band, for example, but as a very high impedance or effective open circuit at the high frequency band, say the FM band in the example put. Terminal 27 of the low frequency tank circuit is connected to a contact 28 included in range switch 24, arm 30 of the range switch being connected to the cathode 11 and constituting the remaining element of the range switch.

It will be seen that each of the tank circuits is adapted to intercouple grid and plate (through by-pass capacitor 14). It will also be seen that each of the tank circuits includes a portion adapted to be selectively coupled between grid and cathode by the action of range switch 24.

During operation on the high frequency band, the impedance of inductor 26 is so high that it acts as an open circuit and effectively disconnects the tank circuit from the control electrode. During such operation contact 28 is open and the low frequency tank circuit is completely disconnected from the cathode. On the other hand, during high frequency operation switch contact 23 is connected through arm 30 to the cathode, and terminal 21 of the high frequency inductor is coupled, through capacitor 22, acting effectively as a short circuit or very low impedance, to the control electrode 12 of tube 10, so that oscillations over the high frequency band are produced. The frequency of the oscillations is, of course, varied by adjustment of capacitor 18 as desired.

During low frequency operation capacitor 22 functions effectively as an open circuit and disconnects terminal 21 of the high frequency tank circuit from the control electrode 12, contact 23 being then disconnected from the cathode. However, inductor 26 under that assumed condition functions effectively as a low impedance or short circuit, coupling the high side of the low frequency tank circuit to the control electrode, while the elements 28 and 30 conductively connect terminal 27 of the low frequency tank circuit to the cathode.

It will be seen that by the circuit arrangement above described, including in particular capacitor 22 and inductor 26, all switch contacts between the tank circuits and the control electrode are completely eliminated, the junction of inductor 26 and capacitor 22 being permanently conductively connected to grid capacitor 16.

Referring now specifically to Fig. 2 of the drawings, there is shown a similar two-band oscillator wherein only the control electrode, rather than the cathode, is selectively coupled to the tank circuit by the range switch. In this embodiment of the invention, the same reference numerals are employed as those used in designating the Fig. 1 elements, and the construction and operation of those elements will be understood to be the same as in Fig. 1, so that further description thereof is unnecessary.

In this embodiment of the invention, terminals 25 and 21 of the low and the high frequency tank circuits, respectively, are individually connected to range switch contacts 28 and 23, respectively, the arm 30 of the switch being connected to coupling capacitor 16, whereby the mechanical switching is on the control electrode side of the tank circuits. Terminal 27 of the low frequency tank circuit is connected through inductor 26 to the cathode, whereby it is electrically coupled to the cathode at low frequency and electrically decoupled from the cathode at high frequency.

Terminal 20 of the high frequency tank circuit is connected to the cathode through capacitor 22, which couples the high frequency tank circuit to the cathode during high frequency operations and effectively uncouples it from the cathode during low frequency operation. The junction of capacitor 22 and inductor 26 is here permanently conductively connected to the cathode 11 of tube 10. It will of course be understood that this embodiment, in either band, operates generally as a Hartley type oscillator.

The LC parameters of tank circuit 17, 18 are such that the oscillator functions on the high frequency band when arm 30 is placed on contact 23. The LC parameters of tank circuit 19, 20 cause the oscillator to function as a low frequency oscillator when arm 30 is placed on contact 28.

Having thus fully disclosed and described my invention, I claim:

1. In a Hartley-type multi-band oscillator, the combination of a high frequency tank circuit, comprising inductance and capacitance in parallel, and a separate low frequency tank circuit, comprising inductance and capacitance in parallel, each of said tank circuits having a grounded terminal and two ungrounded terminals, a single vacuum tube having at least grid and cathode electrodes constituting an input adapted selectively to be coupled to either of said tank circuits, a capacitor having a very low impedance at the high frequency band and a very high impedance at the low frequency band for coupling one ungrounded terminal of the high frequency tank circuit to one of said electrodes, an inductor having a very low impedance at the low frequency band and a very high impedance at the high frequency band for coupling one ungrounded terminal of said low frequency tank circuit to said one electrode, and a range switch having two contacts individually connected to the remaining ungrounded terminals of said tank circuits for selectively coupling either of said remaining ungrounded terminals to the other electrode.

2. In a Hartley-type multi-band oscillator, the combination of a high frequency tank circuit, comprising inductance and capacitance in parallel, and a low frequency tank circuit, comprising inductance and capacitance in parallel, each of said tank circuits having a grounded terminal and two ungrounded terminals, a single vacuum tube having at least a control grid-cathode circuit adapted selectively to be coupled to either of said tank circuits, a blocking capacitor connected to the grid, a second capacitor having a very low impedance at the high frequency band and a very high impedance at the low frequency band for coupling one ungrounded terminal of the high frequency tank circuit to said cathode, an inductor having a very low impedance at the low frequency band and a very high impedance at the high frequency band for coupling one ungrounded terminal of said low frequency tank circuit to said cathode, and a range switch having two contacts individually connected to the remaining ungrounded terminals of said tank circuits and an arm connected to said blocking capacitor for coupling either of said remaining ungrounded terminals to said control electrode through said blocking capacitor.

3. In a multi-band Hartley-type oscillator, the combination of a high frequency tank circuit, comprising inductance and capacitance in parallel, for frequency-modulation signal reception, and a low frequency tank circuit, comprising inductance and capacitance in parallel, for amplitude-modulation signal reception, each of said tank circuits having an end terminal and a tapped terminal, said tank circuits each having a third terminal common to both, a single vacuum tube having at least grid and cathode electrodes constituting an input adapted selectively to be coupled to either of said tank circuits, a capacitor having a very low impedance at the high frequency band and a very high impedance at the low frequency band for coupling the tapped terminal of the high frequency tank circuit to one of said electrodes, an inductor having a very low impedance at the low frequency band and a very high impedance at the high frequency band for coupling the tapped terminal of said low frequency tank circuit to said one electrode, and a range switch having two contacts individually connected to the end terminals of said tank circuits for selectively coupling either of said end terminals to the other electrode.

4. The combination of a high frequency tank circuit, comprising inductance and capacitance in parallel, and a low frequency tank circuit, comprising inductance and capacitance in parallel, each of said tank circuits having two terminals, said tank circuits each having a third terminal common to both, a capacitor having a very low impedance at the high frequency band and a very high impedance at the low frequency band for coupling one terminal of the high frequency tank circuit to a common point, an inductor having a very low impedance at the low frequency band and a very high impedance at the high frequency band for coupling one terminal of said low frequency tank circuit to said common point, and a range switch having an arm and two contacts individually connected to the remaining non-common terminals of said tank circuits, said arm and said common point providing mutually exclusive connections to either of said tank circuits.

5. In a multi-band oscillator of the Hartley type, the combination of a high frequency tank circuit and a low frequency tank circuit, each of said tank circuits having two terminals, said tank circuits each having a third terminal common to both, a vacuum tube having at least two electrodes comprising an input adapted selectively to be coupled to either of said tank circuits, means presenting a very low impedance at the high frequency band and a very high impedance at the low frequency band for coupling one terminal of the high frequency tank circuit to one of said electrodes, means presenting a very low impedance at the low frequency band and a very high impedance at the high frequency band for coupling one terminal of said low frequency tank circuit to the same electrode, and means for selectively and mutually exclusively coupling the other non-common terminals of said tank circuits to the other electrode, each of said tank circuits comprising an inductor and a capacitor in parallel.

ARTHUR DONALD BAYLOR.

REFERENCES CITED

The following references are of record in the file of this patent:

UNITED STATES PATENTS

| Number | Name | Date |
|---|---|---|
| 2,186,434 | Senauke | Jan. 9, 1940 |
| 2,192,978 | MacNabb | Mar. 12, 1940 |
| 2,525,053 | Vilkomerson | Oct. 10, 1950 |

OTHER REFERENCES

Standard Telephones and Cables Pty. Limited (British) 109,435, Jan. 11, 1940, 250-40.4.